United States Patent [19]

Burleson

[11] 3,830,195

[45] Aug. 20, 1974

[54] FINGERPRINT REPRODUCTION MEANS

[76] Inventor: Louis J. Burleson, 1336 N. Ohio, Wichita, Kans. 67214

[22] Filed: Nov. 27, 1972

[21] Appl. No.: 309,671

[52] U.S. Cl. .............................................. 118/31.5
[51] Int. Cl. .............................................. B41k 1/00
[58] Field of Search .......... 118/52, 56, 31.5; 117/.5, 117/1, 1.5

[56] References Cited

UNITED STATES PATENTS

| | | | |
|---|---|---|---|
| 1,507,882 | 9/1924 | Bock | 118/31.5 |
| 1,750,100 | 3/1930 | Glass | 118/31.5 |
| 1,855,200 | 4/1932 | Reichert | 118/31.5 UX |
| 2,299,652 | 10/1942 | Rahn | 118/31.5 |
| 2,500,612 | 3/1950 | Krogh | 118/31.5 |
| 3,467,055 | 9/1969 | Lonchar | 118/31.5 |
| 3,664,910 | 5/1972 | Hollie | 118/31.5 X |
| 3,694,240 | 9/1972 | Miller et al. | 118/31.5 X |
| 3,709,524 | 1/1973 | McKee et al. | 118/31.5 X |

*Primary Examiner*—Morris Kaplan
*Attorney, Agent, or Firm*—John H. Widdowson

[57] ABSTRACT

A fingerprint reproducing device includes a roll of transparent adhesive tape mounted on a hollow spindle having a source of marking material supported therewithin and adapted for transfer to a finger member on contact therewith. The spindle is mounted on a base having a planar surface whereon a section of tape is retained to receive the treated finger to transfer the print thereof to the adhesive surface.

5 Claims, 8 Drawing Figures

FINGERPRINT REPRODUCTION MEANS

Numerous types of fingerprint reproduction devices are known in the prior art for use in conjunction with signed documents wherein a fingerprint is reproducable on a signed document to identify the person signing. Some of these prior art identifying devices are constructed in a multiple manifolding structure which is attachable to a document such as a check or the like. These multiple manifolding devices are adhesively attachable to the document and unfold for use to expose alternating portions of powder and gum-like material to reproduce the fingerprint along with a transparent portion to cover the finished print. These type of manifolding devices by their nature add considerable thickness to a document due to the several layers. When such manifolded devices are attached to checks in particular; they may cause problems at the bank where automated mechanical check canceling and account identifying devices are used due to the increased thickness of the check at the identifier. Other types of document identifying devices use a coated document and require a separate ink reservoir pad to supply ink or the like for reproduction of the fingerprint. With these devices the finger is touched to the ink pad than a coated portion of the document which absorbs the ink and makes it permanent in character; then the person must clean his fingers to remove the ink. These types of identifying devices are somewhat simpler than the manifolded devices yet they are inherently dirty and messy due to the necessity of using a permanent ink requiring the inconvenience of washing hands each time it is used as well as the maintenance of the ink reservoir.

This embodiment of the invention is constructed and adapted to be a unitary device for the marking of documents, including checks and the like. In one preferred specific embodiment, the fingerprint reproduction device of this invention includes an adhesive strip dispenser having an integral marking material dispenser. The strip dispenser is designed to dispense a strip of adhesive material on a portion thereof in a position so a person can touch the sticky side thereof with a finger that has first been touched to marking material and coated with the material. The adhesive strip is removed from the dispenser in a segment including the marked portion thereof and in turn placed on the document desired to be identified with the adhesive side of the strip against the document. The segment of adhesive strip which is attached to the document is large enough for at least one fingerprint and can be unrolled to any desired length from the dispenser.

In another preferred specific embodiment of the fingerprint reproduction device of this invention, the structure includes a container for marking material and separate segments of adhesive strip material to receive the prints. In this embodiment the marking material is contained in a closable container which is opened for a person to touch the material. The adhesive material is provided in separate strip segments having a removable covering over the sticky side thereof which is peeled back prior to use. In use of the device the covering of the strip is peeled back exposing the adhesive; the person touches the adhesive with the marked finger or extremity, then the strip is applied to the document, check, or whatever.

The herein disclosed invention is shown in two embodiments thereof, both of which accomplish the same overall result and having significant structural and operational relationships. The structure of the embodiments of the invention provide an adhesive strip of transparent material in a short segment which is attachable to a document. The adhesive strip segment is markable by a person's finger or extremity after the person has touched a supply of marking material. The marking material is preferably a chalk material stored in a container which will transfer a small portion of the material to a person's finger upon contact; the chalk marking material makes the resultant reproduction of the fingerprint more clearly viewable through the transparent tape when it is attached to the document. The fingerprint reproducing apparatus of this invention is adapted to be used to identify a person's fingerprint with his signature. The intended use of the invention is for a person signing a document to place his finger print adjacent to his signature on the document.

One object of this invention is to provide a document marking device overcoming the aforementioned disadvantages of the prior art devices.

Still, one other object of this invention is to provide a fingerprint reproduction apparatus having an adhesive strip dispenser to dispense strip segments of transparent adhesive material from a roll, the dispenser having an integrally attached container for marking material use in the reproduction of fingerprints.

Still, another object of this invention is to provide a fingerprint reproduction apparatus with an adhesive strip dispenser having a contact portion as a place for a person to touch the adhesive side of the strip with their finger or whatever and also having a container of marking material forming the support for the roll of transparent tape, the marking material container being open on one end thereof for access.

Still, another object of this invention is to provide a fingerprint reproduction apparatus having a closable container for storage of a supply of finger marking material and using preformed segments of transparent adhesive material which are to be marked by a person's extremity that is coated with marking material before the strip is marked and attached to a document.

Yet, another object of this invention is to provide a fingerprint reproduction apparatus which has a closable container for the storage of chalk-like marking material which can be easily opened for access and uses preformed adhesive strip segments of a transparent material having the adhesive side thereof covered with a removable protective coating, the segments being attachable to a document for identification purposes after the protective covering of the strip has been removed and the strip contacted by a person's finger or other extremity which has been previously coated with the chalk-like marking material.

Various other objects, advantages, and features of the invention will become apparent to those skilled in the art from the following discussion, taken in conjunction with the accompanying drawings, in which.

Figures 1, 2:
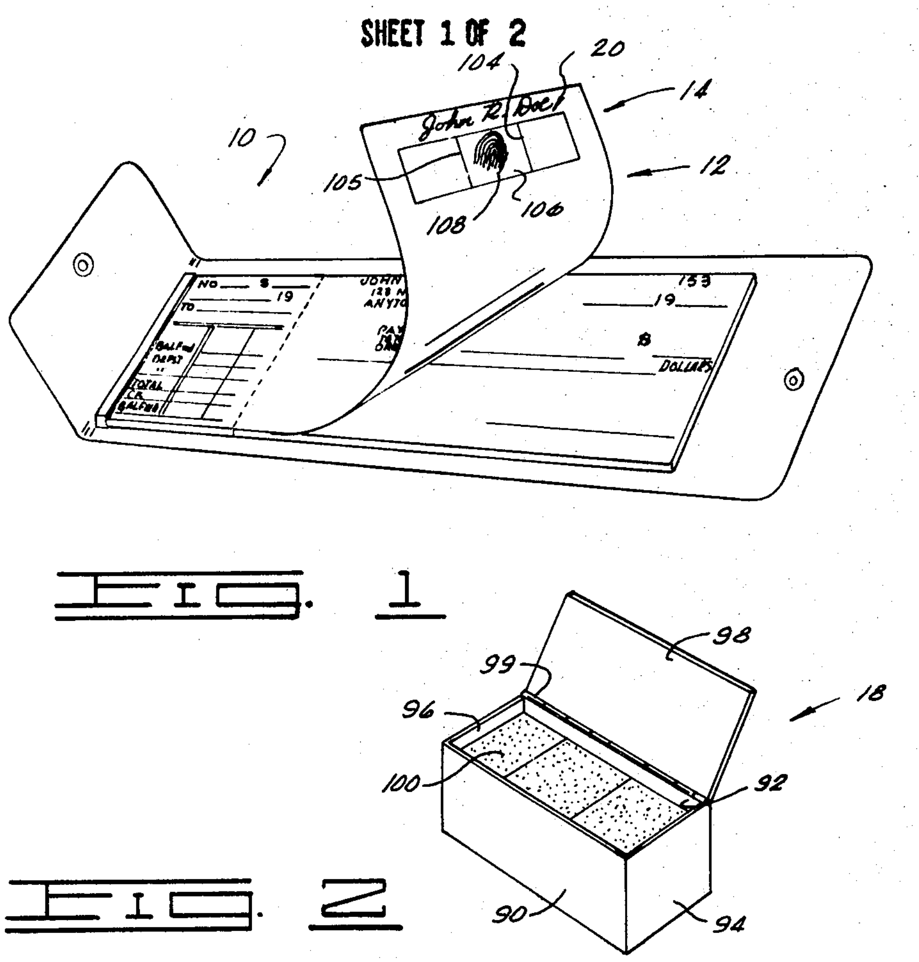
FIG. 1 is a perspective view of a checkbook having the top check thereof turned up with a fingerprinted strip of the protected adhesive material attached to the back thereof at one end for use in indentifying the endorser of the check.
FIG. 2 is a perspective view of the separate marking material container having the lid thereof opened exposing the marking material therein.

The following is a discussion and description of preferred specific embodiments of the fingerprint reproduction apparatus of this invention, such being made with reference to the drawings, whereupon the same reference numerals are used to indicate the same or similar parts and/or structure. It is to be understood that such discussion and description is not to unduly limit the scope of the invention.

Figure 3:
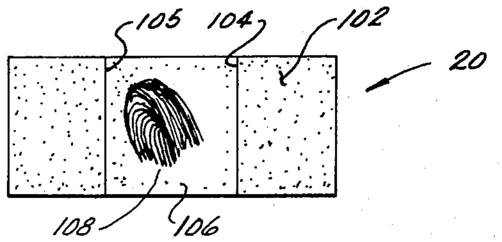
FIG. 3 is a preformed and sectionalized segment of the adhesive strip with the protective cover removed and having a fingerprint reproduced thereon.
Figure 4:
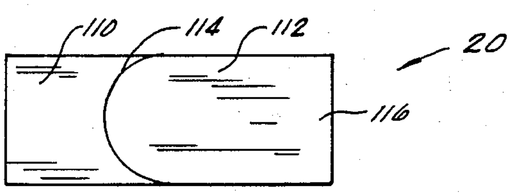
FIG. 4 is a plan view of the preformed adhesive material strip segment with the protective covering in place.

Referring to the drawings in detail and in particular to FIG. 1, a checkbook is shown therein and indicated at 10 with the top check 12 thereof turned back so as to expose one end of its back side and having the fingerprint strip or marked adhesive strip segment 14 of this invention attached thereto. The structure of this invention includes a markable section of a transparent adhesive strip or tape which is attachable to a document for identification purposes and the apparatus to dispense and mark it. In one preferred specific embodiment, (1), of the invention, an integral strip dispenser structure and marking material container are provided to produce the fingerprint strip 14. In another preferred specific embodiment, the invention includes a separate marking material storage container openable for access to the marking material and separate preformed and protected segments of adhesive strip which when uncovered and marked are attachable to the document. The structure of the first described preferred specific embodiment, (1), is shown in FIGS. 5, 6, 7, and 8 and generally indicated at 16. The second described preferred specific embodiment, (2), of the invention is shown in FIGS. 2, 3, and 4 and includes a marking chalk container generally indicated at 18 and preformed separate adhesive strip segments generally indicated at 20.

Figure 5:
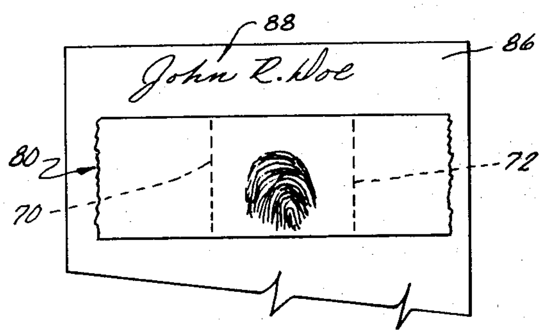
FIG. 5 is a plan view of the back side of a portion of a check having a strip of the adhesive material attached thereto at one end thereof and shown with signature and a fingerprint.
Figure 6:
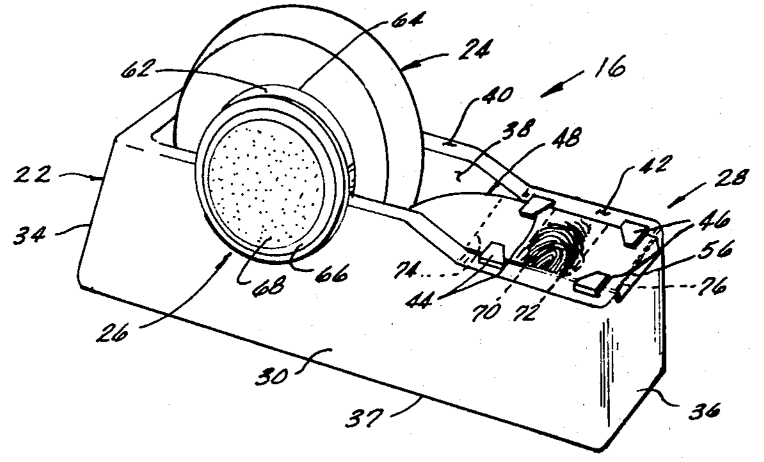
FIG. 6 is a perspective view taken from above of the adhesive strip dispenser and the integral marking chalk container.
Figures 7, 8:
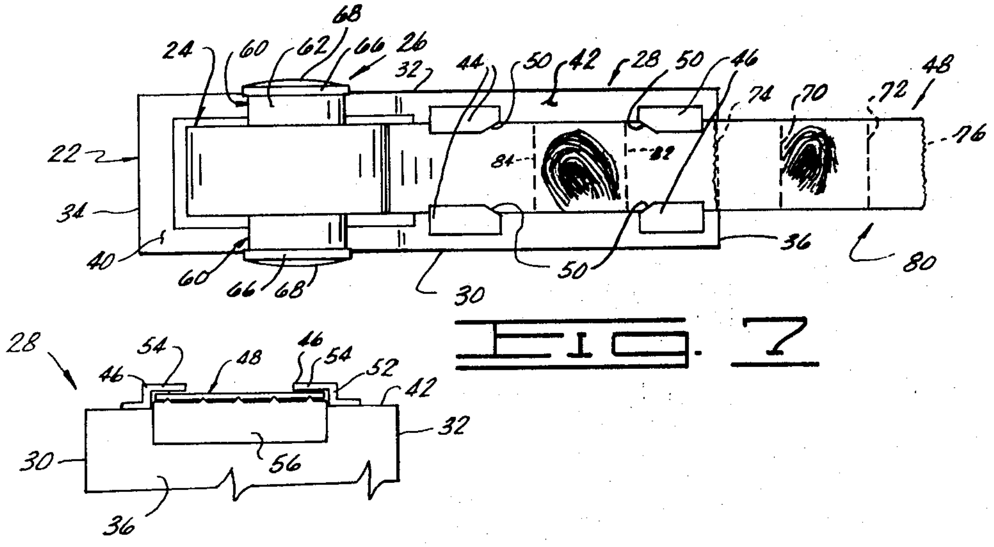
FIG. 7 is a top plan view of the adhesive strip dispenser and marking chalk container as shown in FIG. 6 with a portion of the adhesive strip extending outward past the end of the dispenser.
FIG. 8 is an elevation view of the dispensing end portion of the adhesive strip dispenser showing the strip hold-down clips and the cutter.

A first preferred specific embodiment, (1), of the invention is shown in detail in FIGS. 5, 6, 7, and 8. The structural portions of this embodiment 16 include the structure of the adhesive dispenser indicated at 22, the roll of adhesive material or tape indicated at 24, the roll axle and marking chalk container indicated at 26 and the display and cut-off portion of the dispenser generally indicated at 28. The tape or adhesive strip dispensing structure of this embodiment 16 is constructed and adapted to dispense tape from the roll 24 through the display and cut-off portion of the structure 28 with the sticky side of the tape upwardly exposed for the receipt of the person's finger after it has contacted the marking material and the marking chalk container 26. Once the tape in the display and cut-off portion of the structure 28 has been marked, the tape is pulled from that area and cut off with a cutter on the dispenser structure 22 and then the severed segment placed on a document. The dispenser structure 22 is provided with upright sidewalls 30 and 32 and upright end walls 34 and 36 so as to somewhat resemble a desk model tape dispener. The dispenser 22 is preferably provided with a resilient covering on the base thereof indicated at 37 to prevent it from sliding when tape is pulled and cut. The interior of the dispenser structure 22 is provided with a recessed portion or well cavity indicated at 38 to receive the roll of tape 24 in the position shown in the drawings. The top surface of the dispenser structure at the roll end is indicated at 40; it is slightly higher than the top surface 42 of the display and cut-off end 28. On the display and cut-off end 28 of the dispenser structure the top surface 42 is a flat solid surface and has two pairs of clips extending upward therefrom and curved over the tape as shown. One pair of clips is indicated at 44 and is nearest to the roll of tape 24; the other pair of clips is indicated at 46 and is near the end wall 36 of the dispenser structure. The two pairs of clips 44 and 46 are shown in detail in FIGS. 7 and 8 and they preferably extend upward from the dispenser surface 42 and extend over the outer edge portions of both sides of the tape. The tape or adhesive strip is generally indicated at 48. The tape clips 44 and 46 are preferably shaped as shown in FIG. 7 with a generally rectangular pattern with each of the individual clips appearing to be a rectangle with the inner adjacent corners 50 thereof clipped at an angle. FIG. 8 shows the outer pair of clips 46 from the end thereof wherein they are raised above the surface 42 by an elevated portion 52 providing a space for the tape 48 between the top surface 42 and the bottom of the overhanging clip portion 54. FIG. 8 shows the tape cutter 56 which is a saw-toothed cutter on the dispenser end wall 36 with the teeth thereof extending slightly above the dispenser surface 42 so as to provide a means of cutting the tape 48 when it is pulled downward and over the surface of the cutter 56.

The tape roll end of the dispenser structure 22 has a notch portion generally indicated at 60 in FIG. 7 extending below the top surface 40 thereof which is adapted to receive and hold the roll axle marking chalk container 26. The notch 60 is rounded in its shape and can be slightly less than semi-circular. The notch 60 is formed in both of the dispenser sidewalls 30 and 32 so as to support the roll axle 62 and marking chalk container 26 with the axis thereof transverse to the overall dispenser structure 22. The roll axle has the cylindrical axle portion 62 sized to pass through the center of the roll of tape 24 contacting the tape support center 64 for the roll. Outer end portions of the roll axle 62 are enlarged as indicated at 66 to maintain the axle in a relatively axially fixed position in the dispenser 22. The axle 62 has enlarged axle ends 66 adjacent to the outer side portions of the sidewall 30 and 32 to rest on or adjacent thereto and to prevent the axle 62 from slipping out of the notch 60 by movement in an axial direction. The axle 62 is a cylindrical member generally with a cylindrical interior which is used to receive and hold a marking chalk bag indicated at 68. Marking material or chalk is preferably contained in a large weave mesh cloth bag 68 and placed in the cylindrical interior of the roll axle 62 for easy access. The chalk bag 68 may extend from the ends of the axle 62 a slight amount as shown in FIG. 7 or may be recessed slightly with the axle. In regard to physical size of the tape dispenser structure 22, it can be constructed sufficiently large to receive a roll of tape having a large interior diameter within its center support 64; for instance, in the range of 2 to 4 inches, interior roll diameter. In the alternative, the tape dispenser structure can be sized so as to receive a roll of tape having a small outer diameter and small inner diameter such as having an inner diameter in the range of 1 to 2 inches.

The particular tape 48 which is preferably used with the fingerprint reproduction apparatus of this invention is a transparent tape or adhesive strip of material having good adhesive qualities which is thin and relatively flexible and will receive and hold in place the marking chalk material. The tape 48 is shown in the drawings as dashed secionalizing lines transverse to its elongated axis at regular spaced intervals therealong. It is to be understood that the sectionalizing lines are not absolutely necessary for the end product of the invention; however, the tape may be provided with such lines if desired. The secionalizing lines on the tape 48 are used in the drawings to illustrate the areas of the tape which are used for contact with extremities and for reproduction of the prints. As shown in FIG. 6, the tape 48 has secionalizing lines 70 and 72 between the tape retaining clips 44 and 46 and other sectionalizing lines 74 and 76 on the portions of the tape adjacent to the other sectionalizing lines. With the tape in this position the outermost section line 76 is adjacent to the sawtooth cutter 56, the area of the tape between the section lines 70 and 72 defines the area in which a person will touch the tape once the finger has been coated with the marking chalk material. Once a person has touched the defined area between the sectionalizing lines 70 and 72 the tape is then pulled out from the end of the dispenser through the end retaining clips 46. The retaining clips 44 and 46 function to prevent the tape from pulling upward as a person raises their finger from the defined area as they will after they press their finger onto the sticky side of the tape. FIG. 7 shows the tape in the position it will be when the marked segment 80 is removed. When the dispensed segment 80 is in the position shown in FIG. 7, the section line 74 is adjacent to the sawtooth cutter 56, and other sectional lines 82 and 84 are in the center portion of the top surface 42 between the tape clips 44 and 46 on the portion of the tape 48 adjacent to the dispensed segment 80. In the event that the tape used does not have sectional lines as does the tape shown in the drawings, a person using the device will have to generally gauge for himself the portions of the tape to be used for the print and the roughly equal adjacent portions. It is to be noted that nothing is to prevent a person using the device from using a dispensed segment of the adhesive tape which is longer than or shorter than the proportioned segment shown in the drawings.

FIG. 5 shows the dispensed tape segment 80 attached to the back of a check indicated at 86. The check 86 has a signature 88 at the end of the check immediately above the attached tape segment 80. The tape segment 80 is attached to the check preferably in the general position as shown with the segments elongated axis transverse to the elongated axis of the check and generally in line with the signature 88. It is to be noted that the tape segment 80 is of a length which substantially spans the width of a check; this can be adjusted for different sized checks. Once the tape segment 80 is attached to a check, the fingerprint impression created by the deposit of the chalk material on tape adhesive surface is held in place against the back surface of the check in a substantially permanent condition. The tape segment can be removed from the check back but not without substantially damaging the check so that a person taking the check will notice something is wrong.

In the use of the fingerprint reproduction device of this embodiment, (1), and of the hereinafter described embodiment, (2), it is to be expressly noted that the person making the signature, here John R. Doe, is to be the same person whose fingerprint reproduction appears on the tape segment 80. Additionally, it is to be noted that the signature and affixing of the tape segment is preferably done at the time of endorsement of the check so that a person taking the check has the opportunity to verify for himself the authenticity or authority of the signer of the check and is sure of the person whose fingerprint appears on the tape segment. Furthermore, the identification apparatus of the fingerprint reproduction apparatus of this invention is not to be limited solely for use with checks; it can be used eith other documents requiring signatures and positive verification of the signer; for instance, other documents on which is may be used are other types of negotiable instruments, deeds, wills, contracts, etc. In the use of this invention on checks, the tape 42 should be of such a thin character and fine thickness so as not to interfere with automatic mechanical-electrical check canceling and sorting machines used by some banks as the check passes through the machine and the identifying number or numbers are read and interpreted by the machine.

Another preferred specific embodiment of the fingerprint reproduction apparatus of this invention is shown in FIGS. 1, 2, 3, and 4. This embodiment, (2), includes the marking chalk material container 18 shown in FIG. 2 and uses previously cut tape segments indicated at 20 and shown in FIGS. 3 and 4. The preformed or previously cut tape segments 20 are adhesive tape segments having adhesive on one side of the tape material which is covered by a protective covering. In this embodiment the tape segments 20 are produced in individual elongated segments of transparent tape with the adhesive covered so they can be uncovered, marked and attached to a check at the endorsement time thereof. Other features of this embodiment, (2), are similar to the advantages and features of the other embodiment, (1).

FIG. 2 shows in detail the chalk marking material container. The container 18 is essentially a rectangular box having upright and opposing sidewalls 90, 92, 94, and 96 with a lid 98 attached by a hinge 99 to cover the top of the box and a bottom integrally attached to the sidewalls. The container 18 is used as a storage container for the chalk-like marking material which is preferably a finely ground brown chalk material enclosed in an open mesh bag and is indicated at 100. Using this type of chalk material as a marking material has the advantage that only touching the bag 100 will transfer enough of the material to a person's finger so as to leave a definite impression of the fingerprint and contour of the finger so as to enable identification at a later time. FIG. 3 and FIG. 4 show the precut tape segments 20. The tape segment 20 in FIG. 3 is the segment as it would appear with the protective covering removed, the visible surface 102 being an adhesive surface. Preferably the precut tape segment 20 is rectangular in shape generally similar to that shown and has a pair of transverse dashed sectionalizing lines 104 and 105 in the center portion thereof spaced so as roughly to divide the segment into three portions with the center portion 106 being slightly larger. The center portion 106 is preferably larger than the others so as to receive a finger or thumb print as the one shown therein and indicated at 108. It is to be noted that the precut tape segment 20 can be constructed without the sectionalizing lines without substantially affecting the invention; the lines are preferable as guides. FIG. 4 shows the precut tape segment 20 having the protective adhesive coating covering thereon. The coating covering consists of two portions, an under portion 110 and an over portion 112. Each of the portions overlay slightly more than one-half of the length of the segments. Each of the covering portions 110 and 112 extend to the edges of the tape segment 20. The over segment 112 has a rounded center end portion 114 opposite its rectangular end portion 116 as shown in the drawing. The under segment 110 is shaped similar to the over segment 112 and can be grasped by the finger or fingernail of a person once the over segment has been peeled back.

The marking chalk container 18 is preferably a simple coverable box-like structure as shown in FIG. 2. The container 18 is sufficiently large to permit a person to easily touch the chalk bag 100 to properly coat fingers or other extremities. The container 18 has a closeable cover 98 so it can be kept covered at a cashier's stand, beside a cash register or in a desk to prevent making a mess by inadvertent contact etc., yet it can be opened for use when needed. The container must be large enough in capacity, as a practical matter, to hold enough marking material to be used for a substantial period of use.

The tape segments 20 are made separately so they can be attached to the check at a later time and appear on the covered side as the tape segment does in FIG. 4. At the time of endorsement the protective coverings 110 and 112 are removed from one side of the tape segment 20 and it is placed on the check as shown in FIG. 1 and similar to the tape segment 80 shown in FIG. 5 so that a signature can be placed above the tape segment. Before the preformed tape segment is attached to the check, the protective coverings on the exposed side thereof are removed so a person can leave his fingerprint impression on the segment then it can be placed properly below the signature on the back side of the check or on another document. In the normal use of the precut tape segments 20 the protective coverings 110 and 112 will be peeled back to expose the center portion of the segments so that a person may touch it after having touched the marking chalk bag 100. Use of the precut strip in this way enables a person to hold down the outer portions of the strip while the center portion 106 is being cut so that only the center portion of the strip will be marked. The coverings 110 and 112 can be folded back to the section lines 104 and 105 or further if desired. During this operation the tape segment 20 should be placed on a flat hard surface so as to produce a reproduction of good character. After the reproduction has been made on the tape segement, it can be applied to a document such as the back of a check in much the same way as a person would apply a band aid or adhesive strip bandage to their skin. Once in place the tape segment 20 is attached and becomes essentially a permanent part of the document. FIG. 1 shows a marked tape segment attached to the back of a check which has been endorsed with the signature John R. Doe and is yet to be removed from the checkbook 10. The location of the signature and the tape segment 20 are in a preferred position on the check in FIG. 1. FIG. 5 shows the same arrangement only in a larger size and greater detail of a similar document with the tape segment 80 of the other embodiment, (1), attached to the back of a check; this figure is generally applicable to both the herein disclosed embodiments of the invention, (1 and 2).

It is to be noted that the overall result or end product of both of the herein described embodiments of the fingerprint reproducing apparatus of this invention, (1 and 2), is substantially the same. Both of the embodiments provide a means to reproduce a fingerprint or the like on a segment of transparent adhesive tape that is readily attachable to a document adjacent to a signature for purposes of identification. The tape segments are substantially the same and may or may not have a sectionalizing lines as shown in the drawing. In the first described embodiment, (1), the tape dispenser structure 22 provides a means of supplying the transparent adhesive tape, a place on which the person may touch the tape, a marking chalk reservoir, and a means to cut the segment of tape from the roll. In the second described embodiment, (2), the marking chalk material is provided in a closable container and the tape segments are provided in an individual segmented preformed condition with coverings over the adhesive side thereof which are removed prior to contact and attachment to the document.

In the manufacture of the fingerprint reproduction apparatus of this invention in both embodiments thereof, it is obvious the structure due to its simplicity can be easily produced to achieve the end product. The dispenser structure 22 is very basic in its nature and similar to tape dispenser structures currently in use solely for the dispensing of adhesive tape. The actual dispenser structure including the roll axle 26 can be easily produced by the same methods and using the same manufacturing techniques by which conventional styled tape dispensers are produced making allowances for the size of the roll axle and the addition of the tape clips 44 and 46 and the surface 42 at the cut-off end of the structure. The marking chalk container 18 of the second described embodiment, (2), is a simple box structure and presents no foreseeable manufacturing problem since there are no particular special requirements for the structure other than its closable lid. In regard to the marking chalk containers, namely, the bags and the chalk material, such is preferably a finely ground brown chalk material which is easily obtainable and can be placed in an open mesh bag. The specific bag used to contain the chalk marking material can be rectangularly shaped to fit in the box container 18 or cylindrical shape to fit in the roll axle 26. The specific type of tape used with the reproduction apparatus of this invention must be of a quality that will be substantially permanently attachable to paper documents and will not yellow or discolor with the passage of time so the fingerprint will be clearly readable at a future date. The manufacture of the precut and covered tape segments 20 can be done similar to that for adhesive strip bandages and the strips supplied in much the same manner; namely, in individually wrapped packages or in bulk.

In the use of operation of the fingerprint reproduction apparatus of this invention in both of its herein disclosed embodiments, it is seen that same provides a means of positively identifying a signature with a person by providing a means of attaching a reproduction of a persons's fingerprint to a document. In the use of the first described embodiment, (1), the apparatus has an integral tape dispenser and marking chalk dispenser providing a compact fingerprint reproduction unit. In the second embodiment the apparatus includes a marking chalk container and separate preformed and covered segments of transparent tape which can be separately marked and attached to a document to achieve the end product.

As will become apparent from the foregoing description of the several embodiments of the applicant's fingerprint reproduction apparatus relatively inexpensive and simple means have been provided for the identification of documents, namely, the attachment of a fingerprint reproduction to the document adjacent to the signer's signature. The fingerprint reproduction apparatus is economical to manufacture and use, simple to use in both of the embodiments and provides an identification which can not be changed or erased without significantly effecting the document on which it is placed. The use of the fingerprint reproduction apparatus may be used for identification of various documents for any document wherein it is desirable to provide a means of positively identifying a person's identity with the signature through the use of the person's fingerprints.

While the invention has been described in conjunction with preferred specific embodiments thereof, it will be understood that this description is intended to illustrate and not limit the scope of the invention, which is defined by the following claims.

I claim:

1. A finger print reproducing device comprising:

a. a source of marking material adapted for transfer of such material to a finger in contact therewith;

b. a roll of transparent tape having an adhesive surface;

c. base means including a spindle rotatably supporting said roll for dispensing with said adhesive surface facing upwardly;

d. said base having a generally planar surface portion and tape retaining elements therewith whereby a section of tape drawn from said roll may be retained at said planar surface;

e. said source being retained within at least one end of said spindle; and f. tear means associated with said base means whereby a retained section on whose adhesive surface a finger print has been transferred, by a finger previously in contact with said source, may be separated and transposed to a further support medium.

2. A device as in claim 1 wherein said spindle is cylindrical and said source is retained within the cylinder.

3. A device as in claim 1 wherein said marking material comprises particulate material.

4. A device as in claim 3 wherein said particulate material is enclosed in a perforate container.

5. A device as in claim 1 wherein said spindle is supported at notched sidewalls of said base.

* * * * *